US006645063B1

(12) United States Patent
Völkl

(10) Patent No.: US 6,645,063 B1
(45) Date of Patent: *Nov. 11, 2003

(54) CUTTING AND CALIBRATING DEVICE

(76) Inventor: Thomas Völkl, Am Wald 16, Bruckmühl (DE), D-83052

(*) Notice: Subject to any disclaimer, the term of this patent is extended or adjusted under 35 U.S.C. 154(b) by 0 days.

This patent is subject to a terminal disclaimer.

(21) Appl. No.: 10/048,531

(22) PCT Filed: Aug. 10, 2000

(86) PCT No.: PCT/EP00/07788

§ 371 (c)(1), (2), (4) Date: Jan. 31, 2002

(87) PCT Pub. No.: WO01/12396

PCT Pub. Date: Feb. 22, 2001

(30) Foreign Application Priority Data

Aug. 12, 1999 (DE) ........................................ 199 38 051

(51) Int. Cl.[7] ................................................ A22C 18/00

(52) U.S. Cl. ......................................... 452/149; 99/537

(58) Field of Search ................................ 452/149, 155, 452/150, 156, 174; 99/545, 547, 537, 538, 543; 83/437.4, 559, 437.7, 607, 694, 176, 465, 19

(56) References Cited

U.S. PATENT DOCUMENTS

| | | | | | |
|---|---|---|---|---|---|
| 2,021,794 | A | * | 11/1935 | Leone | 425/574 |
| 2,101,755 | A | * | 12/1937 | Rosenstone et al. | 425/308 |
| 2,500,973 | A | * | 3/1950 | Akerman | 425/308 |
| 3,733,652 | A | * | 5/1973 | House | 425/338 |
| 4,039,691 | A | * | 8/1977 | Hildebolt | 426/511 |
| 4,104,958 | A | * | 8/1978 | Manser et al. | 99/355 |
| 4,356,205 | A | * | 10/1982 | Richards | 426/518 |
| 4,454,804 | A | * | 6/1984 | McCulloch | 99/348 |
| 4,731,006 | A | * | 3/1988 | Freda et al. | 425/190 |
| 4,966,542 | A | * | 10/1990 | Kobayashi | 425/307 |
| 5,030,078 | A | * | 7/1991 | Matthews et al. | 425/133.1 |
| 6,390,799 | B1 | * | 5/2002 | Volkl | 425/308 |

FOREIGN PATENT DOCUMENTS

| | | |
|---|---|---|
| CH | 152 595 | 2/1932 |
| DE | 32 26 790 A1 | 1/1984 |
| DE | 35 40 904 A1 | 5/1987 |
| DE | 197 35 597 A1 | 2/1999 |
| DE | 198 06 561 A1 | 8/1999 |
| JP | 1-193194 | 8/1989 |

* cited by examiner

*Primary Examiner*—Thomas Price
(74) *Attorney, Agent, or Firm*—Nixon & Vanderhye P.C.

(57) ABSTRACT

A cutting and calibrating device for dicing and stripping food, especially for portioning meat in cubes and slices, especially raw meat and comprising a moulding tube, a cutting grid fitted at the end of the moulding tube. An improvement is characterized by the following: a calibrating cavity is provided under the outlet of the moulding tube. The calibrating cavity is perpendicular to the advance movement of the food to be portioned into sizes corresponding at least to the cross-section of the moulding cavity. The depth of the calibrating cavity is equal to the length of the cubes or slices to be produced.

20 Claims, 3 Drawing Sheets

Fig. 1
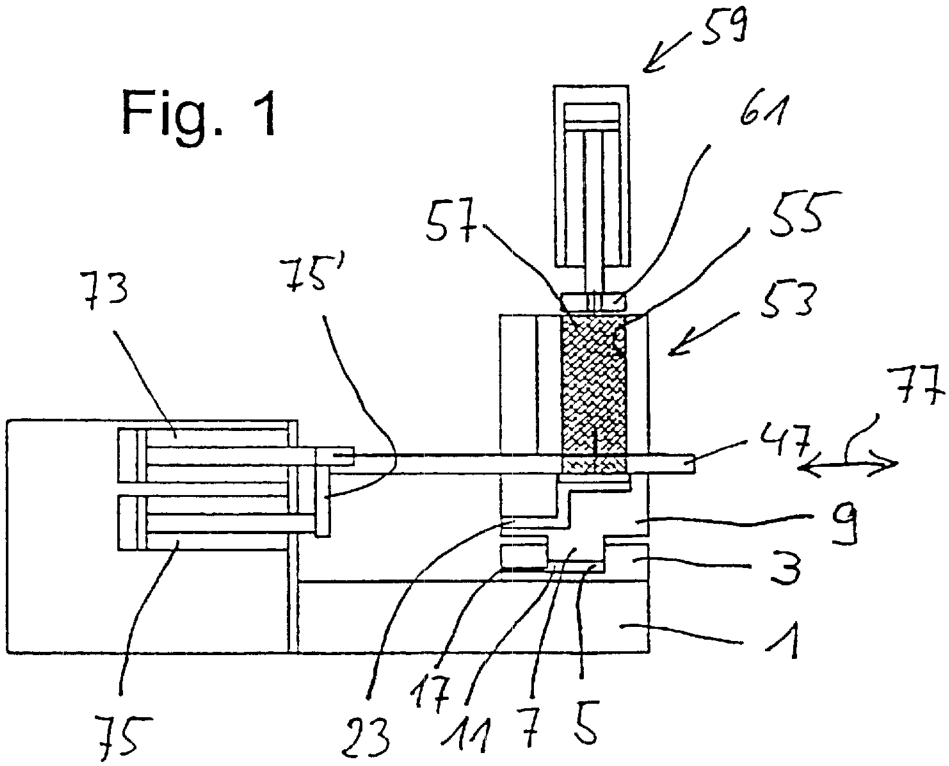
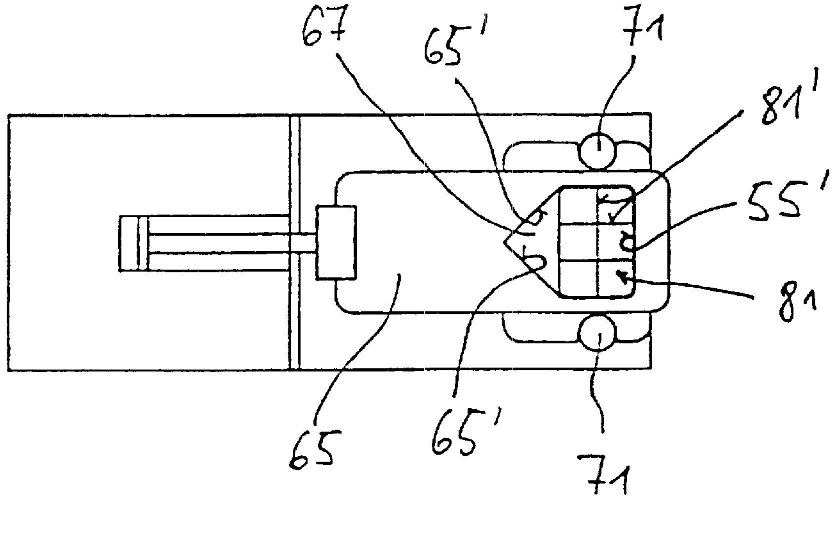
Fig. 2

Fig. 3
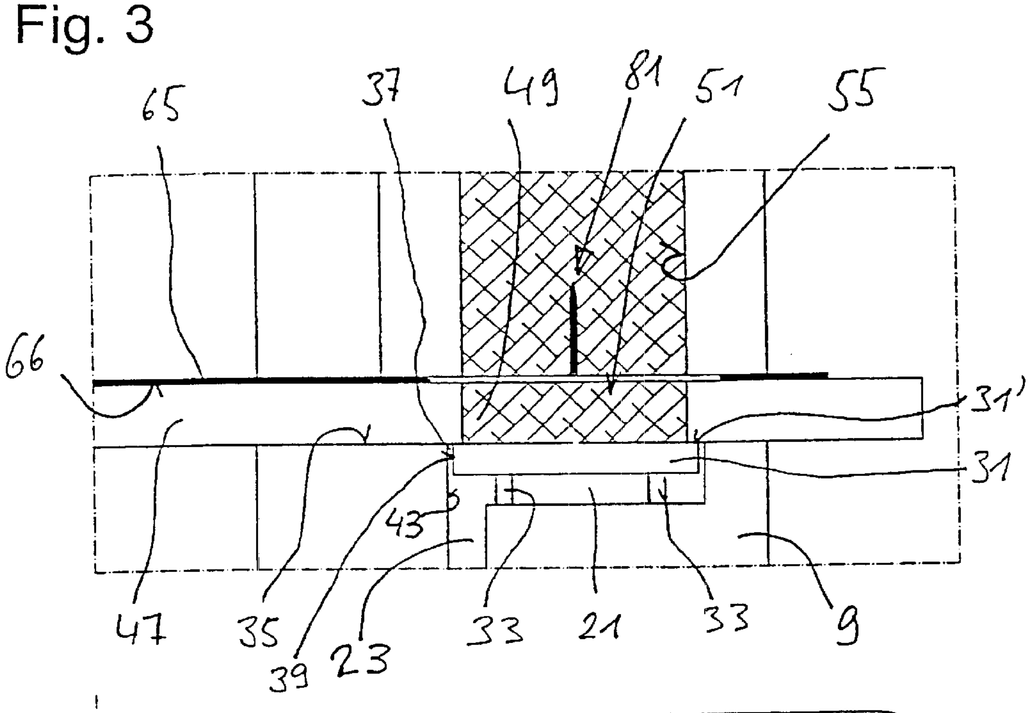
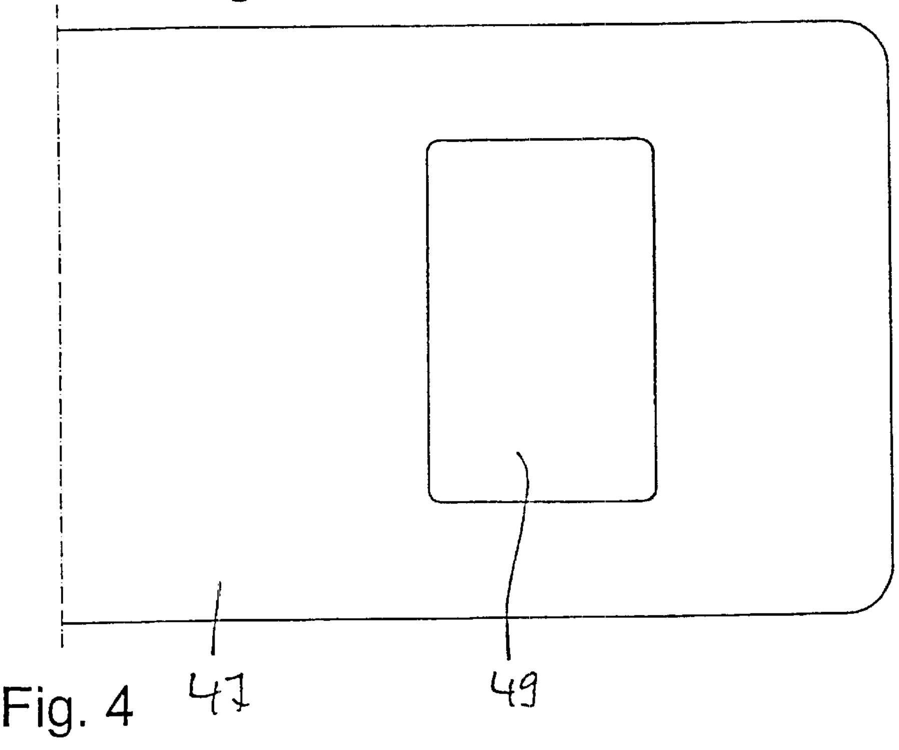
Fig. 4

Fig. 5
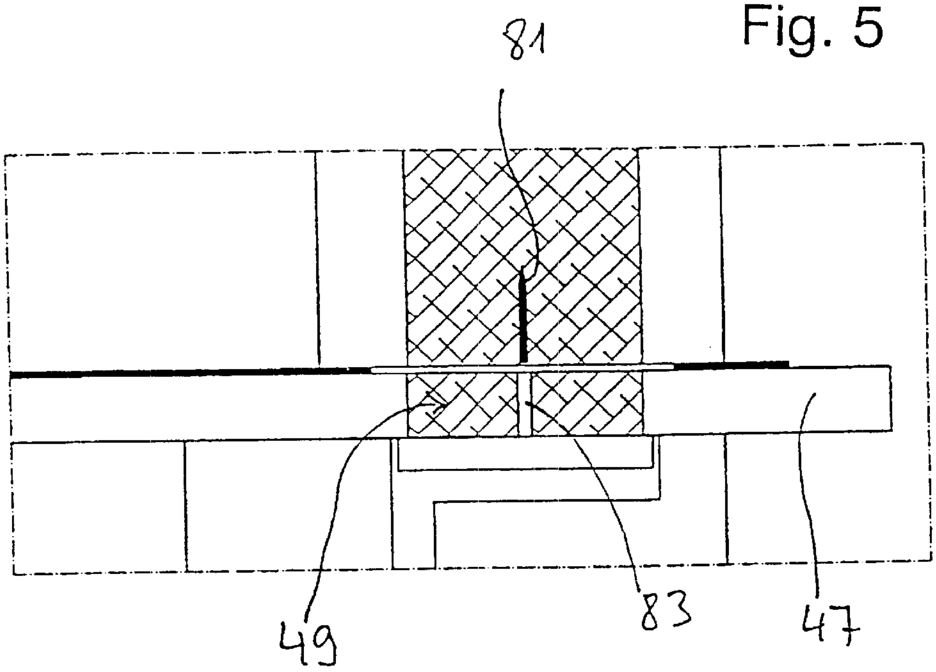
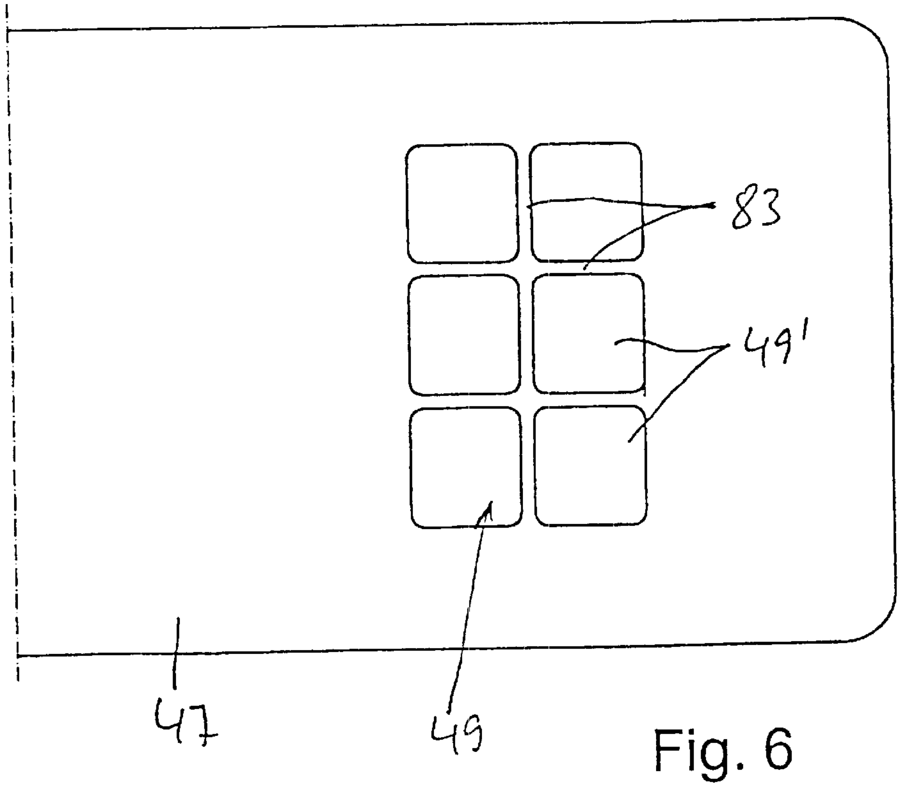
Fig. 6

CUTTING AND CALIBRATING DEVICE

This application is the US national phase of international application PCT/EP00/07788 filed Aug. 10, 2000 which designated the U.S.

BACKGROUND OF THE INVENTION

The invention relates to a calibrating and cutting device, in particular for cutting portions of longitudinally separated pieces of raw meat into strip or dice form.

Particularly the mechanical production of meat kebabs involves the problem of cutting pieces of raw meat into dice form.

A device for cutting pieces of raw meat into dice or longitudinal strips has already been disclosed. Since meat in the thawed state is too yielding and soft to be cut into dice or longitudinal strips, these known methods require the meat to be partially frozen beforehand. It may even be necessary for the piece of meat first of all to be laterally compressed so that it can then be forced out of a pressing cavity, onto a grid-shaped blade arrangement. Pressing the meat through this gate-like blade arrangement leads to the meat being cut into longitudinal strips. A second gate is arranged congruently with the first blade gate in the direction of advance, at a short distance therefrom in the advancing movement of the meat, between which gates a serrated knife is guided through, executing a rotary movement, and as a result, depending on the advancing movement of the meat, cuts the longitudinal strips into dice.

However, a known method of this type is only able to produce very unevenly portioned dice, since the small pieces of meat are often not cut through cleanly. Moreover, this known method cannot be used to process fresh meat, which is too soft, requiring the meat to be at least partially frozen.

Particularly for portioning companies which package their goods in, for example, fresh containers under inert gas (as are also customarily sold in supermarkets), however, it is highly advantageous for meat to be processed fresh. This makes it possible to avoid the following three drawbacks of partial freezing, namely

- a loss of hygiene and/or quality caused by the partial freezing,
- loss of juices from the meat as a result of the partial freezing, and
- loss of colour from the meat, which indicates a loss of freshness to the person in the street.

SUMMARY OF THE INVENTION

Therefore, it is an object of the present invention to provide an improved device and an improved method for producing foodstuff products in dice and/or strip form, in particular for producing pieces of raw meat in dice or strip form.

The present invention allows a considerable improvement compared to conventional solutions while using amazingly simple means.

According to the invention, the meat which is to be divided into portions is forced through a blade gate by means of a pressing cylinder and in this way is longitudinally divided into a number of strands of meat.

A considerable improvement can be achieved by the fact that the meat is not continuously pressed through a blade gate and cut into pieces, but rather the small pieces of meat which are to be cut into dice or strip form are in each case pressed through a corresponding blade gate, but only until the mass of meat which is cut into strip form in the longitudinal direction has been introduced into a portioning plate which is arranged beneath the blade gate, i.e. in the direction of advance of the meat, and is closed at the bottom during this step. This avoids what is known as "twisting" of the strands of meat, which is caused primarily by the different consistency of the various strands of muscle, fat and tendon.

After a calibrating cavity of this type has been filled by the mass of meat which has first been separated and cut through in the longitudinal direction, a blade is then moved through beneath the cutting grid, in other words between the cutting grid and the calibrating cavity, in order then to separate meat portions in diced form from the longitudinal strips. The diced meat portions can then be emptied out of the calibrating plate and the further cutting operation can be carried out in a subsequent, further step.

Although a calibrating device with a fillable calibrating cavity for dividing fillets of meat (for example schnitzel fillets) into portions is known, it has now been found that only the combination of a meat-calibrating device of this type, which is known per se, with a blade gate directly above the calibrating cavity can achieve the desired success. Consequently, according to the invention, it is possible to produce highly uniform dice or strips of meat.

In a further improved embodiment, the uniformity of the individual dice or strips of meat can be improved still further by the fact that, in the calibrating cavity itself, there are also webs, corresponding to the blade-gate arrangement, which therefore lie congruently with the blade gate as seen in the direction of advance of the strips of meat. This is because during the advancing movement, i.e. during the operation of being pressed through the blade gate, the meat to a very large extent behaves in a similar manner to a liquid, so that the strips of meat can even be said to "flow" in the portioning plate, with the result that portions of different sizes would be formed if the additionally mentioned webs were not there to prevent individual strips of meat from "flowing away" to the sides.

BRIEF DESCRIPTION OF THE DRAWINGS

The invention is explained in more detail below with reference to drawings, in which, in detail:

FIG. 1 shows a diagrammatic longitudinal side view through a vertical central longitudinal section through a calibrating and cutting device for the production of pieces of raw meat in dice or strip form;

FIG. 2 shows a diagrammatic horizontal plan view at the level of the cutting blade, with a mould tube having been omitted;

FIG. 3 shows an enlarged, diagrammatic side view of part of FIG. 1, with a calibrating cavity and a blade gate arranged above it;

FIG. 4 shows an enlarged detailed plan view of a calibrating plate with a calibrating cavity used in FIG. 1;

FIG. 5 shows an illustration corresponding to that shown in FIG. 3 in connection with a modified exemplary embodiment with webs additionally provided in the calibrating cavity; and FIG. 6 shows an illustration which corresponds to FIG. 4, illustrating the webs in the calibrating mould.

DETAILED DESCRIPTION OF PREFERRED EMBODIMENTS

The calibrating and cutting device shown in the figures comprises a base 1, which is also referred to below as a base frame.

In the region of one end side of the base frame 1, which is rectangular in plan view, there is fitted a pressure-exerting plate 3 which has an upwardly facing cylindrical bore 5 in which a cylindrical mating piece 7 of a vacuum plate 9 engages.

The cylindrical mating piece 7 of the vacuum plate 9 which engages in the cylindrical bore 5 creates a pressure space 11 of a clamping fixture 13, the importance of which will be dealt with in more detail below.

A compressed-air connection 17 with a following pressure line allows a controlled supply of compressed air to the pressure space 11 from a compressed-air source (not shown in more detail).

The abovementioned vacuum plate 9 has a reduced-pressure space 21 which is connected, via a suction line 23, to a suction connection (not shown in more detail). A vacuum valve (not shown in FIG. 1) may also be fitted in the suction line 23.

An insert plate 31, which is offset at a higher level, by means of feet or spacers 33, with respect to the base of the reduced-pressure space 21, is fitted in the reduced-pressure space 21. The top side 31' of the insert plate 31 is approximately flush with the surface 35 of the vacuum plate 9 or is arranged slightly lower—preferably only fractions of a millimeter lower—than the surface 35 of the vacuum plate 9.

As seen in plan view, the shaping and dimensioning of the insert plate 31, compared to the dimensioning and shaping of the reduced-pressure space 21, likewise in plan view, are configured in such a way that only an extremely small gap is formed between the peripheral edge 39 of the insert plate 31 and the adjacent, encircling wall surface 43 of the reduced-pressure space 21, it being possible for this gap to be, for example, between 0.05 and 2 mm, preferably between 0.01 and 1 mm, in particular between 0.2 and 0.6 mm. A gap width of 0.3 mm has been selected in the exemplary embodiment illustrated. In the exemplary embodiment illustrated, the gap height is 5 mm, thus corresponding to the thickness of the actual insert plate 31 situated above the feet 33. This gap 37 of small dimensions ensures that it is impossible for any relatively large particles of meat to be sucked out during the calibrating and cutting operation (FIG. 3).

A calibrating plate 47, which is shown in its normal position in FIGS. 1 to 3 and comprises a hollow or calibrating mould space 49, which is open at the top and bottom, rests on the surface 35. The upwardly facing feed opening 51 of this space 49, as well as its horizontal cross-sectional shape and dimensioning, correspond to the horizontal cross-sectional shape and dimensioning of a mould-tube body 53 which is arranged above the calibrating plate 47 and has a mould tube 55 located vertically in its interior, from the upper feed side 57 of which tube meat which is to be divided into portions can be supplied and can be displaced downwards by means of a press ram 61 which is arranged above the feed opening 57 and can be actuated by means of a pressure cylinder 59. In plan view, the mould tube is rectangular in cross section, specifically has a rectangular opening 55', as can be seen from the plan view illustrated in FIG. 2. This oval shaping 55'also corresponds, apart from the blade cutting edges 65' oriented in a wedge shape, to the cross-sectional shape and size of the calibrating mould cavity 49. The mould tube 55 or the mould-tube body 53 may be formed from a plurality of plates with corresponding recesses, which can be placed on top of one another, the mould-tube body 53 or the individual plates which form this body being held by two lateral guide columns 71 which are connected to the base 1 and are held securely above it. Alternatively, the mould-tube body may also be divided in two along its longitudinal axis, for example may be in the form of two half-shells.

Since the lower surface of the mould-tube body 53 serves as a sealing surface with respect to the blade 65, the lower bearing or sealing surface 66 of the mould body 55 must cover the V-shaped cutout 67 of the blade 65 in the starting or filling position.

As can be seen from FIG. 1 and, in particular, from the enlarged vertical cross-sectional illustration shown in FIG. 3, the shaping and dimensioning of the opening, which receives the insert plate 31, in the vacuum or reduced-pressure space 21 are slightly larger than the horizontal cross-sectional shaping and dimensioning of the hollow or calibrating mould space 49 in the calibrating plate 47 or the horizontal cross-sectional shape and dimensioning of the mould tube 55.

Finally, a blade 65, i.e. a perforated blade 65, which is approximately rectangular in plan view, i.e. is in plate form, and comprises a blade opening 67 (FIG. 2), which at least corresponds to the size and shape of the transfer opening of the mould tube 55 or of the feed opening 51 of the calibrating mould space 49, is provided between the calibrating plate 47, resting on the latter, and the underside of the mould-tube body 53. In the exemplary embodiment illustrated, the cutting edges, in the leading cutting direction, are of V-shaped design in plan view (FIG. 2), the two cutting edges 65', which lie in a V shape with respect to one another, meeting in the central longitudinal axis of the rectangular perforated blade 65. The two blade cutting edges 65' run, for example, at a 45° angle to the central longitudinal plane of the blade, i.e. include an angle of approximately 90° with one another and, as a result, produce a pulling cut. The blade inclination may also vary correspondingly, for example by at least up to +/−30° or more. Alternatively, it is also possible for exchangeable blades 65' to be provided in a blade body.

However, as an alternative to a reciprocatingly movable blade arrangement, a rotating blade device is also theoretically possible. For example, it would be possible to use a disc-like blade device which comprises continuous blade openings 67 which are offset in sectors with respect to one another and the size and function of which correspond to that of the blade opening described above, in which case a circular or partially circular movement of the blade, with its axis of rotation located outside the blade opening, would have to be carried out in order to execute a cutting operation. In this case, continuous rotary movement, at least in steps, of the blade device would be possible if all the blade openings in the rotating perforated blade have trailing cutting edges.

As well as control elements and devices, it is also possible for at least two cylinders 73 and 75, namely a blade cylinder 73 for moving the perforated blade 65 forwards and backwards as indicated by the arrow 77 and a calibrating cylinder 75 corresponding to the adjustment movements of the calibrating plate 47, likewise in the direction of arrow 77, to be provided on the opposite side of the base frame 1 from the mould-tube body 53. For this purpose, the two calibrating cylinders 75, 77 are securely connected to the blade 65 and the calibrating plate 47, respectively, by means of clamping/holding elements 75', 77'. The blade is preferably of the same shape as the calibrating plate and consists of a solid tool steel, from which it is ground. The blade thickness may vary within suitable ranges, for example from 0.3 mm to 5 mm, preferably from 0.5 mm to 1.0 mm. The blade, like the calibrating plate (which will be dealt with in more detail below), moves at right angles to the vertically oriented mould tube 55.

Finally, at the lower, outlet end of the mould tube 55, there is a blade gate 81 which—as can be seen in particular from the diagrammatic plan view shown in FIG. 2 at the level of the blade gate—comprises a longitudinal blade 81', which divides the rectangular calibrating cavity 49 into two halves, and two transverse blades 81' which are spaced apart perpendicular to the longitudinal blade, so that it is possible to produce six strips of meat in a blade gate of this type.

The method of operation is dealt with below.

Since, as is customary, depending on the extent to which the overall device can be dismantled, cleaning has to be carried out, the device can then be reassembled and put into operation. A suction hose is connected to the abovementioned suction connection, and a compressed-air hose is connected to the compressed-air connection 17, which hoses are connected to corresponding vacuum and compressed-air devices.

Furthermore, three further hose connections are provided. One hose connection is required in order to return the plunger of the vacuum valve. This is because, when the blade reaches its extended limit position after the cutting operation (or just before), a valve plunger of the abovementioned valve arrangement is rotated and the vacuum supply to the reduced-pressure space is interrupted. Then the calibrating plate is moved forwards. The cylinder outgoing air is additionally used to vent the vacuum chamber. As a result, the subatmospheric pressure which is inherently present in the vacuum chamber is eliminated more quickly. The elimination of the subatmospheric pressure prevents the vacuum chamber from still exerting a sucking action as the calibrating plate is being pushed out. The further hose connection mentioned above is used as an air connection for the vacuum chamber in order for compressed air to be pumped in. The latter hose connection is used to connect pressure to the vacuum chamber in order for a vacuum switch to be accommodated in this hose connection, so that the pressure in the vacuum chamber can be measured.

In order for relatively large quantities of meat to be cut into the form of dice or strips, first of all a suitably continuous piece of meat is introduced from above into the feed opening 57 in the mould tube 55, the subatmospheric pressure which has been generated by a vacuum device (not shown in more detail) and is active in the subatmospheric-pressure space 21 pulling the piece of meat further into the mould tube 55. Subsequent actuation of the pressure cylinder 59 assists the advancing movement of the piece of meat.

The subatmospheric pressure which is produced in the subatmospheric-pressure space 21 and the advancing movement of the press ram 61 cause the leading region of the piece of meat which is to be divided into portions to be moved downwards until the front part of the piece of meat which is to be divided into portions completely fills the hollow or calibrating mould space 49. During this advancing movement, the meat is cut into corresponding strips of meat (square in cross section in the exemplary embodiment illustrated) corresponding to the blade gate 81, in the lower outlet region of the mould cavity. During this operation, the extremely small gaps 37 mean, however, that it is impossible for any meat to penetrate into the vacuum and suction gaps 37 or to be sucked out through these gaps.

The subatmospheric pressure which is desired in order to assist the advancing movement of the meat which is to be divided into portions and the complete filling of the calibrating mould cavity 49 by the meat is assisted and ensured primarily through the fact that the entire arrangement comprising mould-tube body 53, perforated blade 65 and the calibrating plate 47 below it are pressed onto one another and clamped in place, as an assembly, by means of the clamping fixture 13 explained at the start, with the pressure-exerting plate and vacuum plate, so that as far as possible no ambient air can penetrate into the subatmospheric-pressure region and reduce the effect of this subatmospheric pressure. Since, moreover, a perforated blade is used, it is also impossible for any atmospheric pressure to reach the subatmospheric-pressure region in the region of the blade. Moreover, the abovementioned guide columns 71 hold the mould-tube body 53 in a fixed, undisplaceable position with respect to the base 1, as a pressure-exerting mating bearing, in order for the clamping unit 13 formed in this way to be optimally pressed together in a corresponding way.

As soon as the pieces of meat which have been cut into longitudinal strips and divided into portions have filled the entire calibrating mould cavity 49, a vacuum switch 27 which is connected to the subatmospheric-pressure space 21 can be used to establish a change in the subatmospheric pressure. Furthermore, it is then possible for the blade cylinder 73 to be primed and actuated, which cylinder is extended in the cutting direction and separates the quantity of meat in the calibrating mould cavity 49 from the quantity of meat in the mould-tube body 53. In the device described, the clamping fixture 13 is permanently subjected to compressive load and clamped, which has the further advantage that it is possible to use an extremely thin blade plate or blade disc. The clamping fixture, which is held under pressure, protects the thin blade metal from bulging out; the blade is also stabilized by the opposite wall sections of the underside 66 of the mould-tube body 53 and the top side of the calibrating plate 47.

As soon as the cutting blade has reached its forward limit position, i.e. at least when the blade opening 67 has moved completely over the feed opening 51 in the calibrating mould cavity 49, the calibrating cylinder 75 and therefore the calibrating plate 47 are likewise set in advancing motion. As soon as the calibrating mould cavity 49 has moved beyond the vacuum plate, the meat can be moved onto a transfer station, for example a removal conveyor belt, etc., either under its own weight or by means of an additional ejector device, for example downwards. A simple auxiliary device which ejects the meat which has been divided into dice portions may comprise, for example, levers which press the meat downwards out of the calibrating mould. A short, sufficiently strong air flow, which can be produced, for example, by cylinder outgoing air, can also be used as an ejector device. Other ejector devices are also possible.

Then, preferably, first of all the calibrating plate and then the perforated blade move back into their starting positions shown in FIGS. 1 to 3 and the operation is repeated, i.e. after the blade 65 and the calibrating plate 47 have reached their starting positions, first of all the clamping fixture 13 is actuated again and a subatmospheric pressure is built up in the vacuum space 21 and, through actuation of the press ram 61, the meat in the mould tube is once again moved onwards in the direction of advance, i.e. into the calibrating mould cavity, etc. As soon as the entire quantity of meat has been divided into portions and the press ram 61, which is moved forwards in the mould tube 55, has reached its lowermost position (which is no lower than the level of the bottom surface of the underside of the counterpressure plate 66 of the mould-tube body 53), a complete cutting operation is carried out once again, so that the press ram can then be moved out of the mould tube.

If different types of meat are to be processed or types of meat of different size and weight are to be divided into portions, it is possible to use differently dimensioned blade and calibrating plates with differently dimensioned and shaped calibrating hollow mould spaces. If the perforated blade and the mould tube remain the same, the calibrating plates then differ by virtue of having a different thickness, in order to change the weight and size of the quantity of meat which is to be divided into portions. However, if it is also intended for the size of the quantity of meat which is to be divided into portions to be changed in side view, it would also be necessary to fit a different perforated blade with correspondingly differently dimensioned blade openings and a mould tube with a different mould-tube cross section.

The calibrating and cutting device explained above makes it possible to produce meat portions of uniform size which, for example, differ by only extremely small amounts of +/−5 grams and less, for example of only +/−2 grams.

FIGS. 5 and 6 show that a grid division 83, which is arranged congruently with respect to the blade gate 81 when seen from above, is formed congruently with respect to the blade gate 81 in the calibrating cavity 49, so that, in the exemplary embodiment illustrated, the calibrating cavity 49 is divided into six partial spaces 49' of equal size. It is quite possible for the thickness of the webs to be slightly greater than the thickness of the blades of the blade gate, although the blades may be designed in such a way that, on the side which is at the bottom with respect to the direction of advance, they have a thickness which corresponds to the web thickness.

Application in principle functions in the same way as for the exemplary embodiment shown in FIGS. 1 to 4. However, the abovementioned webs, which divide the calibrating cavity 49 into individual partial cavities 49', also ensure that "flowing" of the longitudinally cut strands of meat in the portioning plate, i.e. in the calibrating mould cavity, is avoided altogether, and consequently the individual dice can be produced in completely identical weights, even if, on account of a different composition of meat, there were to be more muscular meat in one partial space than in another partial space.

The entire control system can also be of different design. For example, an electrical control system, for example in the form of an SPC, contact or relay control or in the form of combinations, is also suitable. Microprocessor-assisted control is also possible, in particular if the calibrating and cutting device is incorporated in a larger installation. Even in the embodiment illustrated, compressed-air control has been described. Without any detailed description of this having been given, it is possible for magnetic switches to be provided on the cylinders, working valves and control valves; the valves used may be or valves, and valves, 3/2 directional-control valves or, for example, 5/2 valves. Pressure reducers, manometers and vacuum switches are further components which can be used for operation.

For example, it is in particular also possible for the vacuum valve 27 described to be actuated by plunger actuation by the displaceable blade holder and the return air.

A very wide range of variants can be implemented for the vacuum-generating means explained in connection with the operation of the device. For example, it is possible to use a vacuum-generating means based on the Venturi principle in order to generate a subatmospheric pressure. The vacuum-generating means may be switched on by the pneumatic control unit only for the phases when the calibrating cavity is to be refilled with meat. However, it may also be necessary for this unit to be constantly activated, so that a "vacuum cushion" is built up in the filters until the plunger valve 27 opens again. Naturally, it is also possible to use a continuously running vacuum pump. The abovementioned valve plunger 27 only passes subatmospheric pressure into the vacuum or subatmospheric-pressure plate when this subatmospheric pressure is required. In the intervening times, it is possible for a vacuum cushion to be built up in the filters.

The calibrating and cutting device can be used, for example, to achieve a cutting cycle time of 1 second, i.e. one fillet of meat can be divided into portions and ejected every second.

What is claimed is:

1. Calibrating and cutting device for cutting cuttable foodstuffs into dice or strips, in particular for dividing meat, in particular raw meat, into dice or strip portions, having the following features:

a mould tube (55) is provided for forming an advancement passage, in which the foodstuff product which is to be divided into portions can be conveyed onwards, in the advancement passage comprising the mould tube (55), in the end region of the mould tube (55), a blade gate arrangement (81) is provided, by which the foodstuff which is moved forwards can be cut into longitudinal strips, and downstream of the blade gate arrangement (81), as seen in the direction of advance, there is a blade arrangement (45) which can move transversely with respect to the blade gate arrangement (81), in order to cut the longitudinal strips of the foodstuff which is to be divided into portions into corresponding longitudinal-strip sections or dice, characterized by the following further features:

a calibrating mould cavity (49) is provided beneath an outlet opening of the mould tube (55) and/or behind the blade gate arrangement (81), as seen in the direction of advance of the foodstuff which is to be divided into portions, the calibrating mould cavity (49), transversely to the direction of advance of the foodstuff which is to be divided into portions, has a dimension which at least substantially corresponds to the cross-sectional dimensions of the mould cavity, the depth of the calibrating mould cavity (49) corresponds to the length of the strips or dice of foodstuff which are to be divided into portions, and in the calibrating cavity (49) there are webs (83) which, in plan view, in terms of their arrangement and division, correspond to the arrangement and division of the blade gate (81) or rest behind the latter.

2. Calibrating and cutting device according to claim 1, characterized in that in the calibrating cavity (49) there are webs (83) which, in plan view, in terms of their arrangement and distribution, correspond to the arrangement and distribution of the blade gate (81) or rest behind the latter.

3. Calibrating and cutting device according to claim 2, characterized in that the height of the webs (83) corresponds to the height of the calibrating mould cavity (49).

4. Calibrating and cutting device according to claim 1, characterized in that the blade gate (81) is arranged directly in front of the outlet end of the mould tube (55).

5. Calibrating and cutting device according to claim 1, characterized in that there is also a clamping fixture (13), the clamping fixture (13) pressing the mould tube (55) and the calibrating mould cavity (49) against one another, in particular during the cutting operation.

6. Calibrating and cutting device according to claim 5, characterized in that the clamping fixture (13) can be used to press the mould tube (55) and the calibrating mould cavity (49) against one another in order to achieve a subatmospheric pressure which acts via the calibrating mould cavity (49) all the way into the mould tube (55).

7. Calibrating and cutting device according to claim 1, characterized in that the blade (45) is designed as a perforated blade, in the form of a blade plate with a blade opening (67), the blade opening (67), in the starting position of the blade (45), being arranged in such a way that, in plan view, it overlaps the transfer opening (63) on the underside of the mould tube (55) and the feed opening (51) of the calibrating mould cavity (49).

8. Calibrating and cutting device according to claim 1, characterized in that the calibrating mould cavity (49) is formed in a calibrating plate (47), specifically as a calibrating mould cavity (49) which passes through the calibrating plate (47) and is open towards the top and bottom.

9. Calibrating and cutting device according to claim 1, characterized in that the mould tube (55) is arranged in a mould tube body (53) with a downwardly facing supporting surface (66), the perforated blade (65) being incorporated and covered, in the manner of a sandwich, between the supporting surface (66) of the mould-tube body (53) and the calibrating plate (47).

10. Calibrating and cutting device according to claim 1, characterized in that a clamping-cylinder arrangement of the clamping fixture (13) is provided beneath the calibrating plate (47), by means of which clamping-cylinder arrangement the arrangement comprising mould tube (55), perforated blade (65) and calibrating plate (47), preferably together with a vacuum plate (9), can be clamped over a pressure-exerting plate (3) situated beneath it.

11. Calibrating and cutting device according to claim 1, characterized in that a reduced-pressure space (21) is provided beneath the calibrating mould cavity (49) in a vacuum plate (9) in which an insert plate (31), which serves as a rest for the foodstuff which is to be divided into portions, is arranged.

12. Calibrating and cutting device according to claim 1, characterized in that the shaping and dimensioning of the insert plate (31) are slightly larger than the shaping and dimensioning of the feed opening (51) of the calibrating mould cavity (49) and/or of the transfer opening (63) of the mould tube (55).

13. Calibrating and cutting device according to claim 11, characterized in that a gap (37), which preferably runs all the way around, is formed, as a reduced-pressure passage, between the peripheral edge of the insert plate (31) and the adjoining wall section (43) of the reduced-pressure space (21).

14. Calibrating and cutting device according to claim 12, characterized in that the gap (37) is less than 2 mm.

15. Calibrating and cutting device according to claim 1, characterized in that the blade opening (67) has a basic shape and size which corresponds to the cross-sectional shape and size of the mould tube (55) and/or of the feed opening (51) of the calibrating mould cavity (49).

16. Calibrating and cutting device according to claim 15, characterized in that two cutting edges (65'), which run at an angle to one another, are provided on the leading side of the blade opening (67).

17. Calibrating and cutting device according to claim 16, characterized in that the two cutting edges include an angle of +60° to 120°, preferably of around 90°, with one another.

18. Calibrating and cutting device according to claim 16, characterized in that the two blade cutting edges (65') are arranged symmetrically with respect to a vertical central longitudinal plane.

19. Calibrating and cutting device according to claim 16, characterized in that the blade comprises steel plate, the thickness of which varies between 0.2 mm and 6 mm.

20. Calibrating and cutting device according to claim 1, characterized in that the calibrating plate (47) and the blade (65) are arranged perpendicular to the vertical extent of the mould tube (55).

* * * * *